United States Patent [19]
Cochran

[11] 3,908,804
[45] Sept. 30, 1975

[54] SERVICE AND PARKING BRAKE ACTUATION PISTON WITH ADJUSTER MECHANISM

[75] Inventor: Thomas E. Cochran, Aurora, Ill.

[73] Assignee: Caterpillar Tractor Company, Peoria, Ill.

[22] Filed: July 11, 1974

[21] Appl. No.: 487,727

[52] U.S. Cl. .............................. 188/170; 188/196 B
[51] Int. Cl.² ........................................ F16D 65/24
[58] Field of Search ........... 188/170, 71.8, 79.5 GE, 188/196 B

[56] References Cited
UNITED STATES PATENTS 3,547,233  12/1970  Girvan ................................. 188/170
3,599,761  8/1971  Schultz et al. ....................... 188/170

FOREIGN PATENTS OR APPLICATIONS 1,451,466  7/1966  France .............................. 188/71.8

*Primary Examiner*—Duane A. Reger
*Attorney, Agent, or Firm*—Phillips, Moore, Weissenberger Lempio & Strabala

[57] ABSTRACT

A combined service and parking brake system is provided with an automatically adjustable actuator that compensates for wear in the friction means of the system. The parking brakes are spring-applied and hydraulic pressure released, and the service brakes are hydraulically actuated. The actuator includes a pair of pistons with one piston including rachet means.

7 Claims, 2 Drawing Figures

SERVICE AND PARKING BRAKE ACTUATION PISTON WITH ADJUSTER MECHANISM

BACKGROUND OF THE INVENTION

The present invention relates to brake systems and pertains particularly to an automatically adjusting brake-actuating assembly.

The present invention is directed to an automatically adjustable actuating assembly for the brake system having a combined service and parking brake system. The present invention is particularly directed to the type actuating assemblies in which the parking brake is spring-actuated and pressure released hydraulically, and the service brakes are hydraulically operated. The combined systems operate through the same brake shoe or pad system and with the same general actuator assembly.

This type of combined system is typically employed on earth-moving type vehicles wherein the parking brake system is applied automatically upon failure of pressure of the remaining system. The brake also acts as a parking brake when pressure in the hydraulic system is permitted to leak down.

Mechanisms that automatically adjust to compensate for wear of brake friction surfaces are well known in the art. Such systems, however, are quite complicated and are expensive to install and maintain. Such wear-compensating systems are provided to prevent excess lag of brake-actuation that occurs when wear increases requiring further travel of the actuating linkages.

Examples of the prior art are exemplified by the following U.S. patents:

U.S. Pat. No. 3,366,996 issued Mar. 2, 1971 to Crossman;

U.S. Pat. No. 3,517,785 issued June 30, 1972 to Cunningham. These, however, fail to provide a solution to the problem in systems of the present invention.

ASSEMBLY AND OBJECTS OF THE INVENTION

It is a primary object of the present invention to overcome the above-described problems of the prior art.

Another object of the present invention is to provide a simple and inexpensive brake-actuating assembly having automatic adjusting means.

A further object of the present invention is to provide an automatically adjusting brake-actuating assembly for combined service and parking brake systems wherein the parking brakes are spring-actuated and the service brakes are hydraulically actuated.

In accordance with the primary aspect of the present invention there is provided an automatically adjustable brake-actuating assembly including first and second piston means operatively connected to the brake linkage and including spring means engaging one of the pistons for actuating the brake linkage and including hydraulic means for releasing the spring-applied brake means and further hydraulic means for actuating the brake means.

BRIEF DESCRIPTION OF THE DRAWINGS

The above and other objects and advantages of the present invention will become apparent from the following specification when read in conjunction with the accompanying drawings wherein.

DETAILED DESCRIPTION OF THE PREFERRED EMBODIMENT

Figure 1:
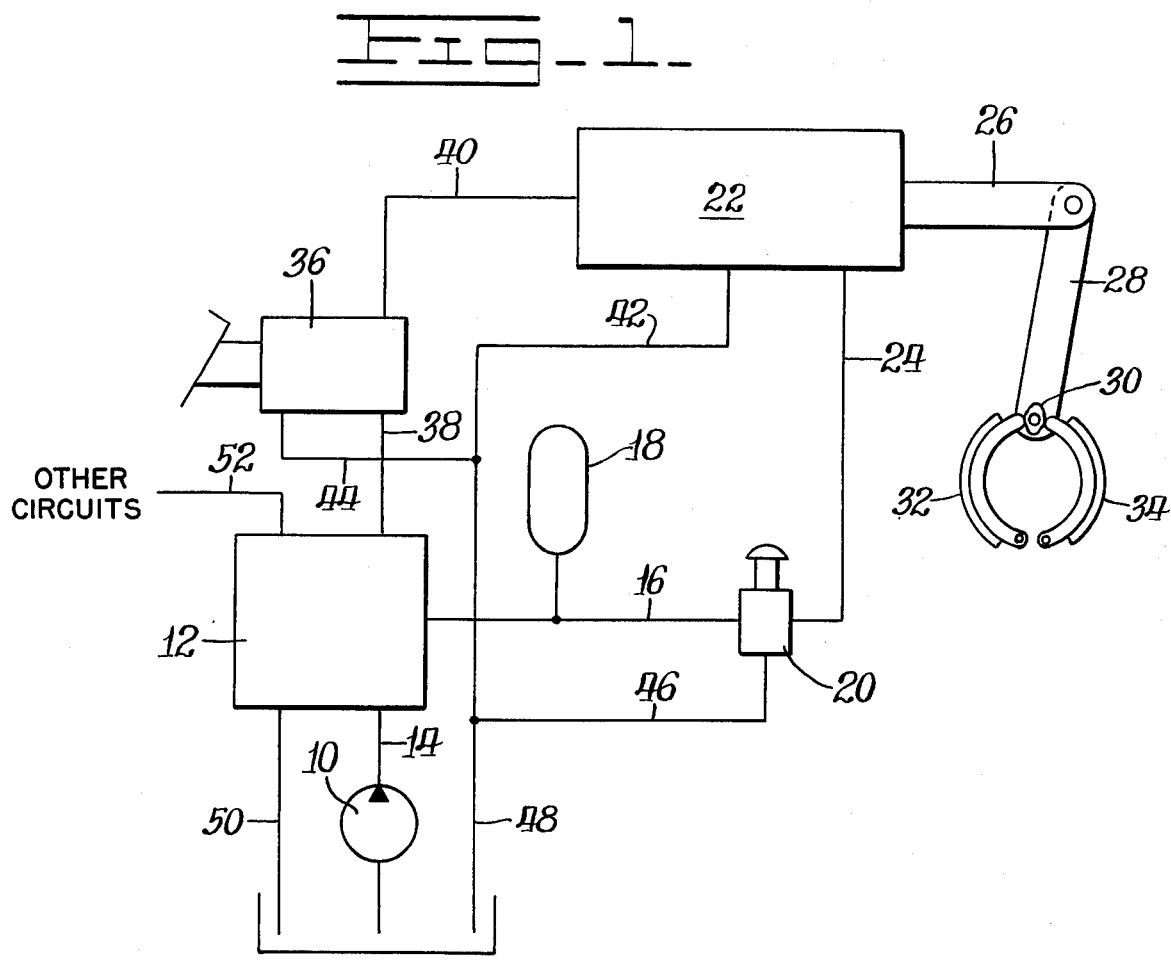
FIG. 1 is a schematic layout of a brake system incorporating the present invention.

Referring now to FIG. 1, there is illustrated a schematic layout of a hydraulic brake system including a pump 10 for supplying pressurized fluid to an accumulator charging and relief valve assembly 12 by way of a conduit or line 14. The accumulator charging and relief valve assembly 12 may be of any suitable type such as that shown in U.S. Pat. No. 3,570,519 assigned to the assignee hereof.

Suitable conduit means 16 provides communication of valve 12 with an accumulator 18 and with an on-off valve 20. The valve 20 is operative in a first position to provide communication of pressurized fluid from source 18 with a brake-actuating and adjusting assembly 22 by way of suitable conduit means 24. The brake-actuating assembly 22 is operatively connected by suitable link means 26 which is pivotably connected to suitable lever 28 which operates by means of a cam 30, suitable brake or friction means such as brakeband assemblies 32 and 34 which are adapted to engage conventional brake-rotating means such as a drum or disc not shown.

A suitable brake valve 36 which may be foot-pedal or lever-operated is operatively connected to accumulator valve assembly 12 by means of conduit means 38 and to the actuator assembly 22 by means of a conduit means 40. The valves 20 and 36 and the actuator assembly 22 are provided with suitable fluid-return lines 46, 44 and 42 communicating with fluid-return line 48 for return of fluid back to tank or reservoir. Valve 20 in a second position communicates fluid from the brake-actuating and adjusting assembly 22 by way of line 24 to return line 46. These return lines may also supply fluid for other operations of the vehicle. For example, valve 12 is provided with a suitable return conduit means 50 and with a line or conduit 52 which supplies fluid to other circuits such as the steering circuit of the vehicle.

Figure 2:
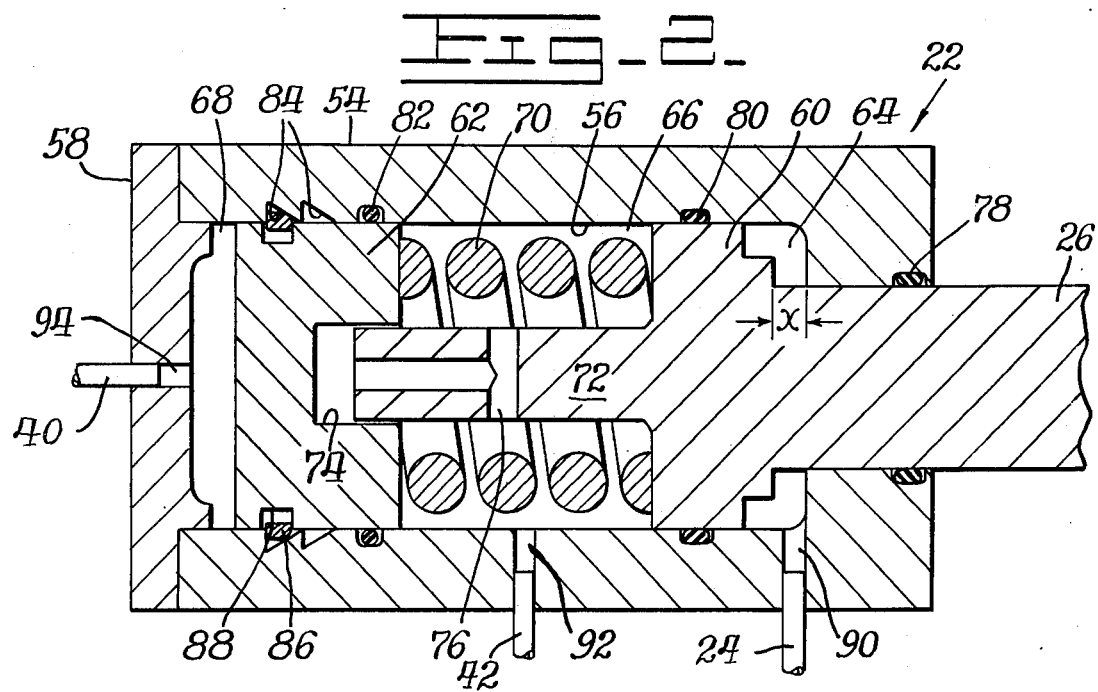
FIG. 2 is a cross-sectional view of a brake-actuator assembly incorporating a preferred embodiment to the present invention.

Referring now to FIG. 2 there is shown in detail a sectional view of the actuating assembly 22 of FIG. 1. The assembly is shown in the spring "on" or parking brake on position.

The actuating assembly comprises a housing 54 having a cylindrical bore 56 formed therein and including a cover 58 enclosing the bore and defining a chamber. Reciprocably mounted within the bore 66 is a first piston 60 and a second piston 62, dividing the chamber into a plurality of chambers 64, 66 and 68. A high-tension compression spring 70 is mounted between and in compressive engagement with both of the pistons 60 and 62 and is operative to bias the first piston 60 to the brake-actuated position for emergency and parking brake purposes.

The piston 60 includes an extension 72 extending substantially axially thereof toward the second piston 62 and extending into a bore 74 formed therein. Suitable passage means 76 is provided to prevent hydraulic lock of the two pistons. Suitable sealing means such as a plurality of O-rings 78, 80 and 82 are provided to provide suitable sealing between the respective numbers and the bores. These seals or O-rings may be formed in grooves formed in the bores themselves or in the respective pistons as preferred.

The adjusting means of the present invention includes ratchet means defined by a plurality of sawtooth shaped (in cross section) grooves 84 sloping axially inward formed within the bore 56 of the housing 54. Any number of these grooves may be provided. Radially expanding annular resilient means 86 is mounted within an annular groove 88 formed in piston 62 and is operative to expand radially outward for engagement with the respective annular grooves 84. The expanding resilient means 86 may preferably be a split spring steel ring. The ring would have sufficient clearance to ride upon the groove as the piston 62 moves rightward to permit it to move to the next annular groove 84. The groove 88 is made wider than ring 86 to provide clearance for piston 62 to release the brakes when the ring catches in the next groove 84.

Suitable port means 90 is provided for the communication of pressurized fluid into and out of the first pressure chamber 64 by way of conduit 24 for moving the piston 60 leftward against the action of spring 74 releasing the brakes.

It should also be noted that sufficient clearance designated "x" is provided between the face of piston 60 and the end wall of the housing to permit a significant amount of adjustment in this assembly.

Second port means 92 is provided for fluid from the chamber 66 between the pistons 60 and 62 by way of conduit 42. This conduit means may be provided simply to drain the chamber 66 to prevent hydraulic lock between the two pistons.

The leftward movement of piston 60 would be limited by the extension 72 engaging the bottom of bore 74 formed in piston 62. The movement of piston 62 rightwardly adjusts the brake assembly.

Port means 94 communicates pressurized fluid with chamber 68 by way of conduit 40 for the communication of pressurized fluid thereto and therefrom. Introduction of pressure into this chamber 68 forces piston 62 to the right to thus actuate the brake assembly and periodically provide an adjustment in the brake assembly. Thus, movement of piston 62 to the right transmits the force thereof to piston 60 and moves it toward the right over coming the pressure in chamber 64 for actuation of the brake assembly. The piston 62 must move to the right sufficiently to engage the end extension of 72 in order to transmit force to the piston 60 for actuation thereof. This, of course, neglects the pressure transmitted to spring 70 from piston 62 to piston 60.

It will be noted that the area of piston 60 acted on by pressure in chamber 64 is less than the area of piston 62 acted on by fluid in chamber 68. Since the pressurized fluid in both chambers is from the same source 10 and 18, piston 62 can easily push piston 60 to the right when pressurized fluid from that source is introduced into chamber 68. This forces the fluid from chamber 64 via conduit 24, valve 20 and conduit 16 back to the accumulator 18.

The parking brakes are applied simply by shifting valve 20 to communicate line or conduit 24 with conduit 46 to vent chamber 64 so that the spring 70 biases piston 60 to the right to apply the brakes.

Upon pressurization of the chamber 68 piston 62 moves to the right with ring 86 riding upon the wall 84 of the grooves 84 and back down as the piston moves back to the left. When sufficient clearance exists in the brake system for the spring 86 to move into the next groove 84, the piston 62 is prevented from returning back to its initial position to the left, and thus an adjustment of the length of the first groove is achieved in the braking system.

From the above description, it is seen that there is provided a simple brake-actuating assembly having automatic adjusting means. While this invention is described and illustrated with respect to a single embodiment, it is to be understood that numerous changes and modifications may be made therein without departing from the spirit and scope of the invention as defined in the appended claims.

I claim:

1. In an adjustable brake-actuating assembly, the combination comprising:

friction means for engaging a rotatable element;

actuator means for moving said friction means into an engaged position, and into a disengaged position with respect to said rotatable element;

said actuator means including a housing having a cylindrical bore formed therein;

spring means in said bore for normally biasing said friction means into said engaged position;

first piston means reciprocally mounted in said bore for moving said friction means to a disengaged position;

second piston means reciprocally mounted in said bore for biasing said friction means to said engaged position; and automatic adjusting means for automatically adjusting the stroke of said first and said second hydraulic means for adjusting said brake assembly, said automatic adjusting means comprising ratchet means mounted between one of said pistons and said housing and operative to permit free movement of said piston toward said engaged position and to limit movement of said piston toward said disengaged position.

2. The brake assembly of claim 1 wherein said ratchet means comprises a plurality of annular grooves formed in said cylindrical bore; and radially expandable spring means carried by said piston for engagement with said grooves.

3. The brake assembly of claim 2 comprising spring means disposed between said piston means.

4. The brake assembly of claim 3 wherein said actuator means includes first conduit means for communicating fluid to and from one side of said first piston;

second conduit means for communicating fluid from between said piston; and third conduit means for communicating fluid to and from the other side of said second piston means.

5. In an adjustable brake-actuating assembly, the combination comprising:

friction means for engaging a rotatable element;

actuator means for moving said friction means into an engaged position, and into a disengaged position with respect to said rotatable element;

said actuator means including a housing defining an enclosed cylindrical bore, first and second pistons reciprocably mounted in said bore and separating same into first and second pressure chambers;

linkage means connecting said first piston to said friction means;

spring means disposed between said pistons for normally biasing said friction means into said engaged position;

means for introducing pressurized fluid into selected ones of said chambers for biasing said first piston to said engaged position and to said disengaged position, said adjusting means comprising ratchet means between said second piston and said housing for limiting movement of said second piston in one direction.

6. The brake assembly of claim 5 wherein said ratchet means comprises a plurality of grooves formed in said cylindrical bore; and an expandable ring mounted on said piston for engagement with said grooves.

7. The brake assembly of claim 6 wherein said second piston includes an annular groove, and said expandable ring is mounted in said groove.

* * * * *